(12) United States Patent
Mennechet et al.

(10) Patent No.: US 11,047,707 B2
(45) Date of Patent: Jun. 29, 2021

(54) VISUALIZATION METHOD OF THE ATTITUDE OF AN AIRCRAFT, ASSOCIATED COMPUTER PROGRAM PRODUCT AND VISUALIZATION SYSTEM

(71) Applicant: THALES, Courbevoie (FR)

(72) Inventors: Florent Mennechet, Merignac (FR); Xavier Servantie, Merignac (FR)

(73) Assignee: THALES, Courbevoie (FR)

(*) Notice: Subject to any disclaimer, the term of this patent is extended or adjusted under 35 U.S.C. 154(b) by 316 days.

(21) Appl. No.: 16/261,223

(22) Filed: Jan. 29, 2019

(65) Prior Publication Data

US 2019/0242722 A1 Aug. 8, 2019

(30) Foreign Application Priority Data

Feb. 5, 2018 (FR) ...................................... 18 00115

(51) Int. Cl.
*G01C 23/00* (2006.01)

(52) U.S. Cl.
CPC ................................. *G01C 23/005* (2013.01)

(58) Field of Classification Search
None
See application file for complete search history.

(56) References Cited

U.S. PATENT DOCUMENTS

| | | | |
|---|---|---|---|
| 4,305,057 A | 12/1981 | Rolston | |
| 5,067,667 A * | 11/1991 | Shivers, Jr. ........ | G01C 23/005 244/1 R |
| 5,198,812 A * | 3/1993 | Probert ................ | G01C 23/00 340/974 |
| 5,337,048 A * | 8/1994 | Penwill ................ | G01C 23/00 340/974 |
| 5,675,328 A * | 10/1997 | Coirier ................ | G01C 23/005 340/974 |

(Continued)

FOREIGN PATENT DOCUMENTS

| | | |
|---|---|---|
| EP | 0 358 619 A2 | 3/1990 |
| WO | WO 92/01906 A1 | 2/1992 |

OTHER PUBLICATIONS

Jake1729, "F-16 Incentive Flight Full Length HUD Cam", video as displayed on URL:https://www.youtube.com/watchv=Jor18EdSxW4&index=35&list=PL52b8asqsMEPL2z9sm8EcWsCbrqJtvJL, as retrieved on Nov. 16, 2018.

(Continued)

*Primary Examiner* — Navid Ziaeianmehdizadeh
(74) *Attorney, Agent, or Firm* — Arent Fox LLP (57) ABSTRACT

The present invention relates to a visualization method of the attitude of an aircraft, comprising the formation of a pitch scale (E) defining a lower border and an upper border, and including:
  to visualize the nil pitch angle of the aircraft, a zero graduation on the lower border and the upper border;
  to visualize the negative pitch angles of the aircraft, straight parallel graduations forming at least two groups converging toward one another with the approach of the zero graduation from the lower border; and
  to visualize the positive pitch angles of the aircraft, curved graduations, the curvature of which increases moving away from the zero graduation toward the upper border.

16 Claims, 5 Drawing Sheets

(56) References Cited

U.S. PATENT DOCUMENTS 6,686,850 B2 * 2/2004 Hausmann ............ G01C 23/00
340/967
2008/0262664 A1 10/2008 Schnell et al.

OTHER PUBLICATIONS

Preliminary Search Report of related French Application No. FR 18 00115, dated Jan. 16, 2019.
Rogers, S., et al., "Development of a Flight Simulator and an Intelligent Symbology Management System for Helmet Mounted Displays in Rotorcraft", U.S. Army and Missile Command, pp. 1-191, Jun. 1999.

* cited by examiner

VISUALIZATION METHOD OF THE ATTITUDE OF AN AIRCRAFT, ASSOCIATED COMPUTER PROGRAM PRODUCT AND VISUALIZATION SYSTEM

CROSS-REFERENCE TO RELATED APPLICATIONS

This application claims priority to French Patent Application No. 18 00115, filed on Feb. 5, 2018. The disclosure of the prior application is hereby expressly incorporated by reference in its entirety.

FIELD OF THE INVENTION

The present invention relates to a visualization method of the attitude of an aircraft.

The present invention also relates to an associated computer program product and visualization system.

BACKGROUND OF THE INVENTION

Different visualization methods and devices of the attitude of aircraft exist in the state of the art.

Thus, among these devices, known in particular is a traditional dashboard instrument known under the name "ADI" (Attitude Display Indicator) in particular including a simple representative of the aircraft and a pitch scale including a horizon line.

The position of the symbol representative of the aircraft relative to the horizon line allows the pilot to determine the pitch angle of the aircraft as well as its incline relative to a horizontal plane. According to different aeronautic schools, the horizon line may be mobile relative to the representative symbol or the reverse, the representative symbol may be mobile relative to the horizon line.

With the development of display screens for aircraft cockpits, the attitude display indicator is most often integrated into one of these screens, where it is viewed by using an appropriate graphic interface. One example of such a screen is the Primary Flight Display, or PFD.

In this case, the display of the attitude of the aircraft is done on a viewer of the "head-down" type, since the pilot must generally tilt his head, or at least his gaze, downward to read the displayed information.

For viewers of the "head-up" type, also known using the acronym HUD (for Head Up Display), the methods for visualizing the attitude of the aircraft may be more sophisticated.

In particular, in such a case, it is possible to obtain a display compliant with an actual landscape perceived by the pilot. Thus, for example, it is possible to have a horizon line displayed on a HUD viewer coincide with the actual horizon line seen by the pilot.

To implement such a display, in particular known is a method consisting of determining a cylinder around the aircraft such that its height is parallel to the actual horizon line and the longitudinal axis of the aircraft is oriented toward the side surface of said cylinder. Thus, on the side surface of the cylinder, it is possible to determine a pitch scale that is next projected on the corresponding HUD viewer.

However, independently of the type of viewer used, there is a need for an intuitive display of the attitude of the aircraft to allow the pilot to have a better awareness of his spatial situation. This need is in particular identified for the reestablishment of so-called "unusual" situations, to combat cases of spatial disorientation of the pilot and also to offer an understanding of the attitude of the aircraft demanding the mobilization of fewer cognitive resources for the pilot.

An unusual situation should be understood as a flight with very strong pitch angles (positive or negative) that may go as far as the airplane flying on its back. These situations in particular appear in fighter planes, for example in the context of air-to-air combat.

In particular, in these unusual situations, the existing visualization methods and devices of the attitude prove inappropriate inasmuch as the horizon line is often outside the field of view of the pilot and the scrolling of the pitch scales is too fast to be readable. It is thus often necessary for the pilot to stabilize its movement in order to make the displayed symbology understandable.

SUMMARY OF THE INVENTION

The present invention aims to resolve these drawbacks and therefore to propose a visualization method of the attitude making it possible to avoid the disorientation of the pilot even in unusual situations while demanding a minimal cognitive load from him to understand his spatial situation.

To that end, the invention relates to a visualization method of the attitude of an aircraft, comprising the formation of a pitch scale defining a lower border and an upper border, and including, to visualize the nil pitch angle of the aircraft, a zero graduation on the lower border and the upper border; to visualize the negative pitch angles of the aircraft, straight parallel graduations forming at least two groups converging toward one another with the approach of the zero graduation from the lower border; and to visualize the positive pitch angles of the aircraft, curved graduations, the curvature of which increases moving away from the zero graduation toward the upper border.

According to other advantageous aspects of the invention, the method comprises one or more of the following features, considered alone or according to all technically possible combinations:

the groups of straight parallel graduations converge toward one another to a vanishing point corresponding to a predetermined pitch angle of the aircraft, the predetermined pitch angle preferably corresponding to a nil pitch angle of the aircraft;

the aircraft defines a longitudinal axis and an observation point of its attitude; the method comprising a first phase for determining the straight graduations including the following steps:

determining a first plane representative of a perspective, the first plane being situated in front of the aircraft, intersecting the longitudinal axis and being obtained by tilting a horizontal reference plane by a non-nil incline angle;

determining a plurality of second planes representative of different negative pitch angles of the aircraft, each second plane including the observation point and passing through the first plane along an intersection line, the intersection lines being parallel to one another;

projecting intersection lines over a projection surface to obtain a plurality of straight projections over said projection surface;

the first phase further includes a step for truncating intersection lines via at least two pairs of first truncating planes to obtain at least two truncated parts of each intersection line, each truncated part being comprised between the first truncating planes of a same pair of first truncating planes, each first truncating plane being perpendicular to the horizontal reference plane; the straight projections then corresponding to projections of the truncated parts of the intersection lines over the projection surface;

said two pairs of first truncating planes are situated, at the aircraft, on either side of the longitudinal axis;

the angle between the first truncating planes of a same pair of first truncating planes is variable as a function of the pitch angle of the aircraft;

the vanishing point corresponds to the point of intersection of the set of lines connecting corresponding ends of the projections of the corresponding truncated parts of the intersection lines;

on the projection surface, the straight parallel projections are spaced apart from one another by a same distance;

in the observation point, the second planes are spaced apart from one another by a same angle;

the first plane is truncated by the horizontal reference plane and extends below said horizontal reference plane; and the incline angle of the first plane with respect to the horizontal reference plane is between 0° and 90°, preferably between 10° and 30°;

the aircraft defines a longitudinal axis and an observation point of its attitude;

the method further comprising a second step for determining curved graduations including the following steps:

determining a sphere centered on the observation point, truncated by a horizontal reference plane and extending above said horizontal reference plane;

determining a plurality of circles, each circle belonging to the sphere and extending in planes parallel to the horizontal reference plane;

projecting circles over the projection surface to obtain a plurality of curved projections over said projection surface;

a third visualization phase including the following steps:

building the pitch scale from straight projections forming the straight graduations and from curved projections forming the curved graduations;

visualizing the pitch scale and an immobile symbol representative of the aircraft on a display screen;

the third phase further including a visualization step of symbols specific to the lower and upper borders of the pitch scale;

the third phase further including a step for truncating circles via at least two pairs of second truncating planes to obtain at least two truncated parts of each circle, each truncated part being comprised between the second truncating planes of a same pair of second truncating planes, each second truncating plane being perpendicular to the horizontal reference plane; the curved projections then corresponding to projections of the truncated parts of the circles over the projection surface;

said two pairs of second truncating planes are situated, at the aircraft, on either side of the longitudinal axis; each second truncating plane preferably being parallel to the longitudinal axis.

The invention also relates to a computer program product including software instructions which, when implemented by computer equipment, carry out the method as previously defined.

The invention also relates to a visualization system of the attitude of an aircraft, including technical means implementing the method as previously described.

BRIEF DESCRIPTION OF THE DRAWINGS

These features and advantages of the invention will appear upon reading the following description, provided solely as a non-limiting example, and done in reference to the appended drawings, in which.

DETAILED DESCRIPTION OF THE INVENTION

Figure 1:
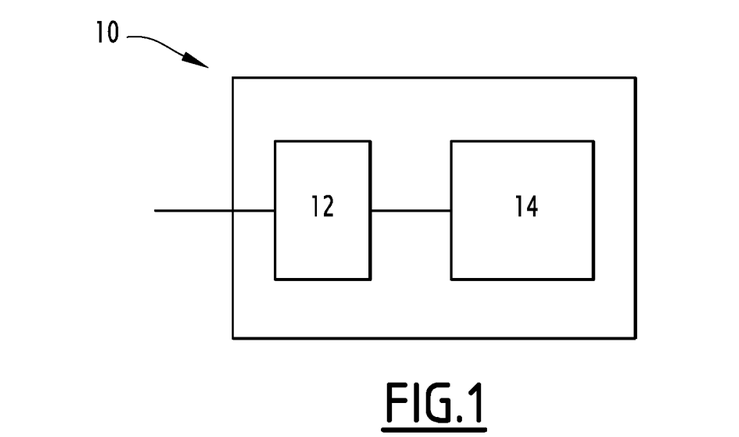
FIG. 1 is a schematic illustration of a visualization system according to the invention.

The visualization system 10 of FIG. 1 is usable in the cockpit of an aircraft by the crew thereof.

An aircraft refers to any vehicle able to be piloted to fly in particular in the Earth's atmosphere, such as an airplane, in particular a fighter plane, helicopter, a drone, etc.

The cockpit of said aircraft refers to the location from which the piloting of the aircraft is done. The cockpit is arranged inside the aircraft traditionally or is located outside the aircraft. In the latter case, it is in particular a remote piloting center piloting the aircraft remotely, as is in particular the case for a drone.

Crew of the aircraft refers to one or several pilots piloting the aircraft from the cockpit. When the crew is made up of several pilots, the concept of "pilot" used in the rest of the description relates to one of these pilots, advantageously the pilot directly using the visualization system according to the invention.

The aircraft defines a longitudinal axis and an observation point of its attitude.

The longitudinal axis extends along the aircraft and is generally also known under the term "roll axis". The pitch angle of the aircraft corresponds to the angle formed between the longitudinal axis and a horizontal plane of a land-based coordinate system.

The observation point of the attitude of the aircraft corresponds to a point of the aircraft from which the observation, and optionally the control, of the attitude of the aircraft are done. Thus, this observation point advantageously corresponds to the eye of the pilot. When the piloting is done remotely, this point corresponds to an acquisition point for images of the surroundings of the aircraft that will be sent to the remote piloting center.

The aircraft further defines a transverse axis perpendicular to the longitudinal axis and for example extending along the airfoil of the aircraft. This axis is also known under the term "pitch axis". The incline of the aircraft corresponds to the angle formed between the transverse axis and a horizontal plane of a land-based coordinate system.

In reference to this FIG. 1, the visualization system 10 comprises a processing module 12 and a display screen 14.

The processing module 12 is configured to acquire information relative to the current attitude of the aircraft. To that end, the processing module 12 is connected to an inertial unit of the aircraft or any other on-board device known in itself that is able in particular to provide the current pitch angle and the current incline of the aircraft.

The processing module 12 is further configured to process this information, as will be explained hereinafter to visualize the current attitude of the aircraft on the display screen 14.

The processing module 12 for example at least partially assumes the form of software that is executed by an appropriate processor and is stored in an appropriate memory.

Alternatively or additionally, the processing module 12 at least partially assumes the form of a physical device, for example a programmable circuit.

The display screen 14 is connected to the processing module 12 and is able to display information from said module.

According to one advantageous example embodiment of the invention, the display screen 14 is a head up display known in itself.

This display screen 14 is arranged in front of the pilot or is integrated into his helmet. It is at least partially transparent and makes it possible to display information relative to the piloting of the aircraft in a manner compliant with the reality observed by the pilot. In a manner known in itself, the information relative to the piloting of the aircraft is for example projected on said screen by appropriate projecting means.

According to another example embodiment, the display screen 14 is a head down display also known in itself.

Figure 2:
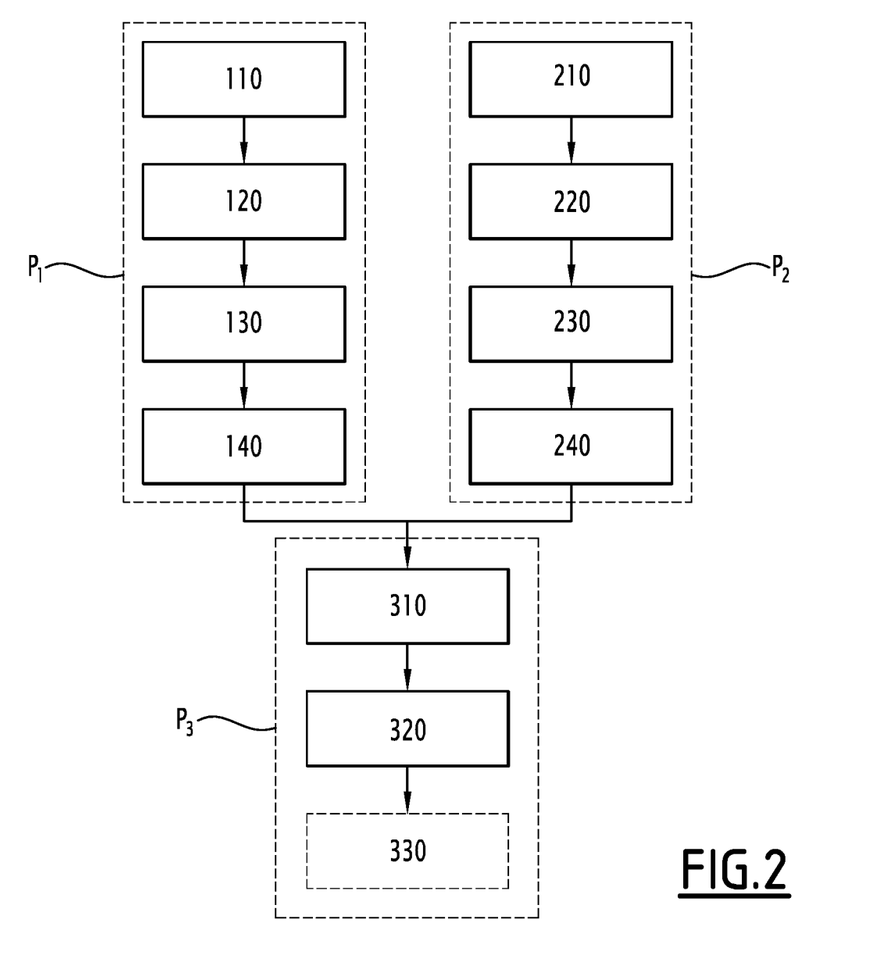
FIG. 2 is a flowchart of a visualization method according to the invention, the method being carried out by the system of FIG. 1.

The visualization method implemented by the visualization system 10 will now be explained in reference to FIG. 2, showing a flowchart of its steps, and in reference to FIGS. 3, 6, 8 and 10 schematically illustrating the implementation of these different steps for different current pitch angles of the aircraft.

In particular, the left part of each of FIGS. 3, 6, 8 and 10 schematically illustrates a side view of the different forms obtained during the implementation of the method. The right part of each of said figures schematically illustrates a perspective view of said forms, for example from the observation point.

Figure 3:
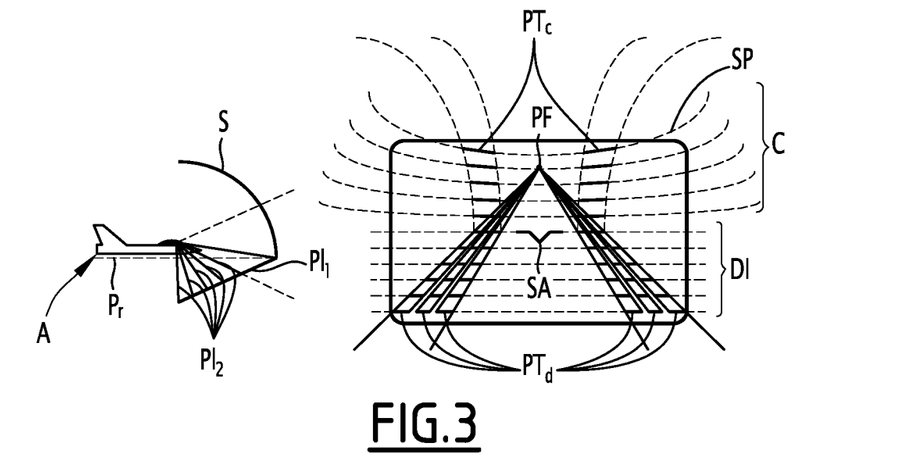
FIGS. 3 to 11 are images explaining the implementation of the method of FIG. 2.
Figure 4:
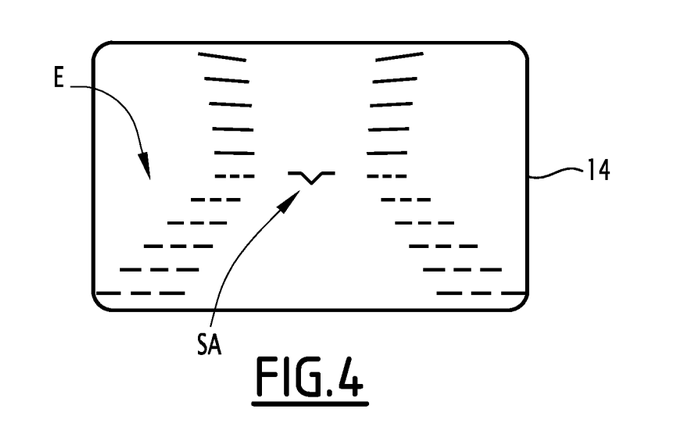
Figure 6:
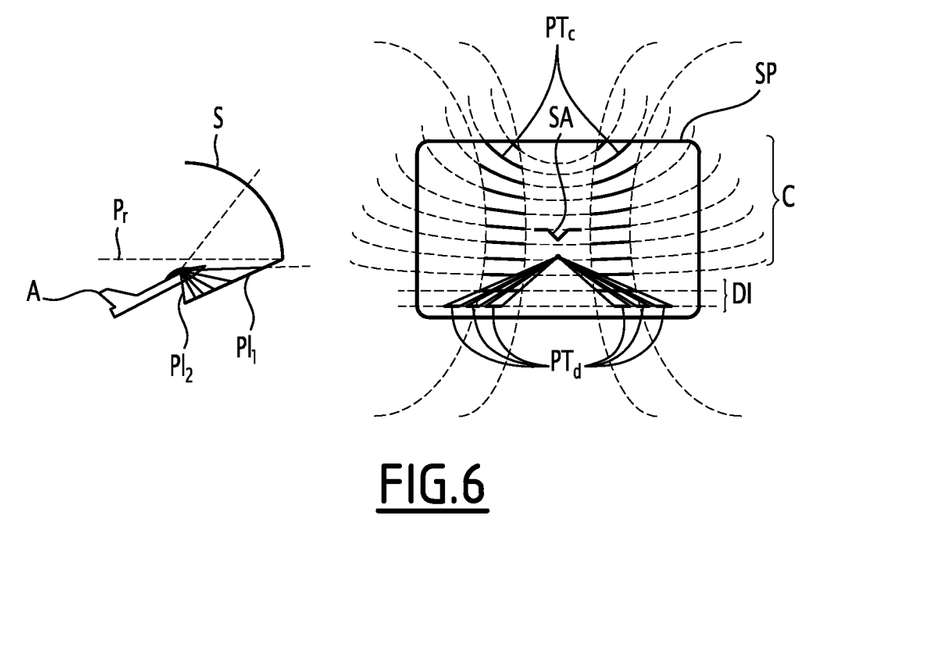
Figure 7:
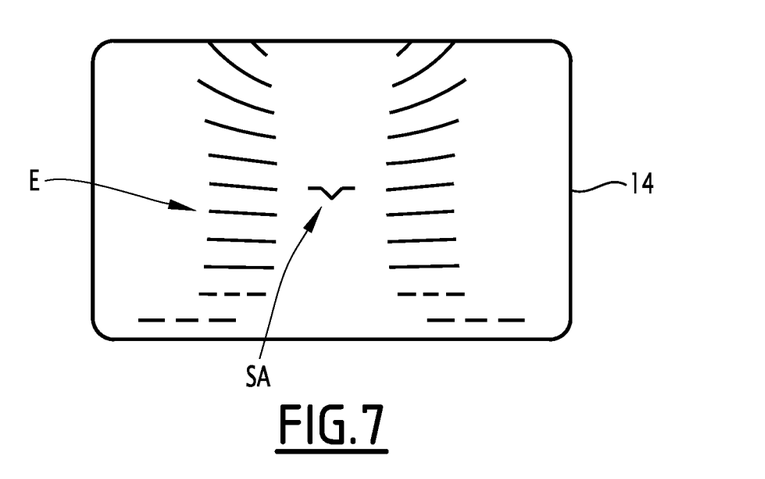
Figure 8:
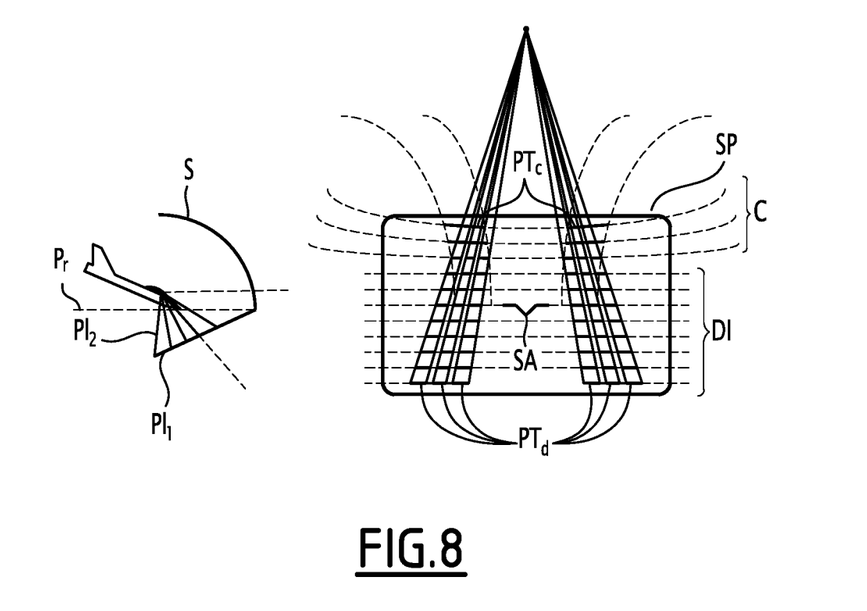
Figure 9:
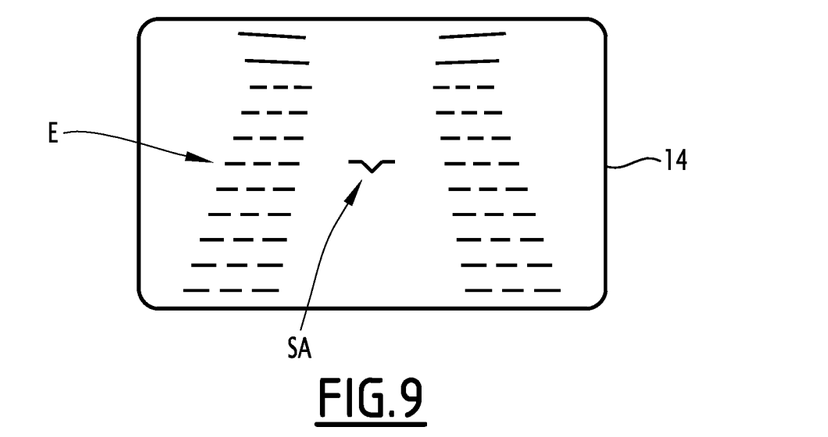
Figure 10:
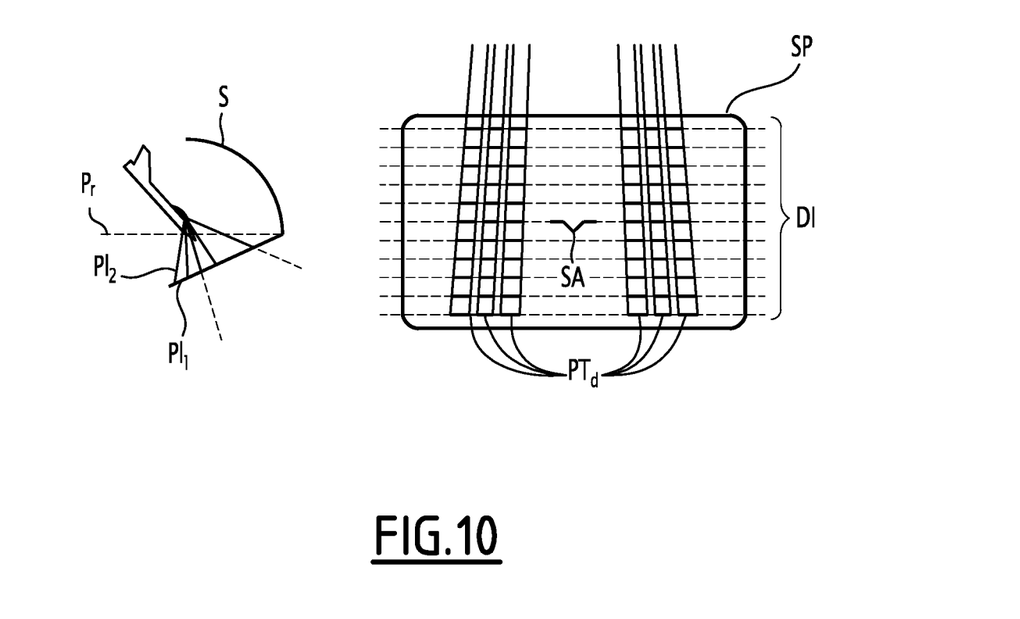
Figure 11:
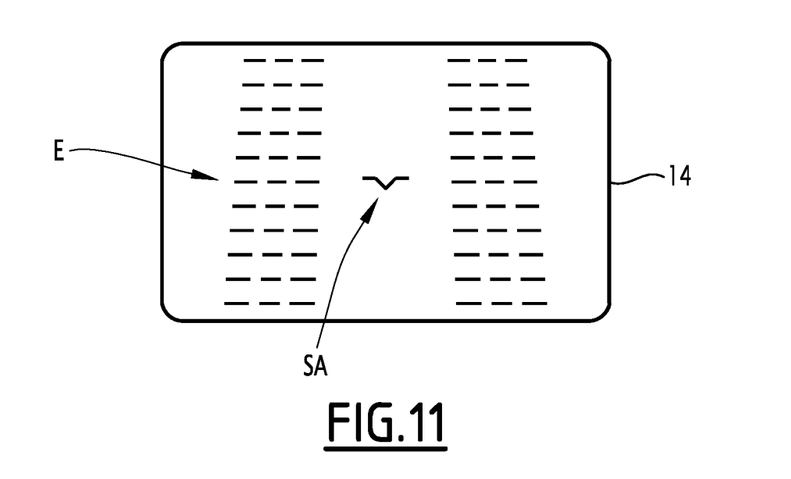

In FIG. 3, the aircraft A is in horizontal flight and its pitch angle is therefore equal to 0°. In FIG. 6, the aircraft A is pulling up and its pitch angle is therefore positive. In FIGS. 8 and 10, the aircraft A is in nose down attitude and its pitch angle is therefore negative, the pitch angle of the aircraft A of FIG. 10 being lower than that of FIG. 8. In all of FIGS. 3, 6, 9 and 10, the incline of the aircraft A is substantially equal to 0°.

The visualization method in particular makes it possible to display, on the screen 14, a pitch scale made up of a zero graduation in order to visualize the nil pitch angle of the aircraft, straight graduations to visualize the negative pitch angles of the aircraft and curved graduations to visualize the positive pitch angles of the aircraft.

To that end, the method includes a first phase $P_1$ making it possible to determine the straight graduations of the scale, a second phase $P_2$ making it possible to determine the curved graduations of the scale and a third phase $P_3$ making it possible to form and visualize said pitch scale.

The first phase $P_1$ and the second phase $P_2$ are carried out in parallel or one after the other. The third phase $P_3$ is carried out after carrying out the phases $P_1$ and $P_2$.

Initially, the processing module 12 acquires the information relative to the current attitude of the aircraft. This information in particular comprises the current pitch angle and the current incline (or roll) of the aircraft.

The processing module 12 further defines a projection surface on which different forms obtained during the implementation of the method will be projected, in order to be visualized.

The projection surface is a virtual surface situated in front of the observation point inside or outside the aircraft.

When the display screen 14 is a viewer of the head up type, the projection surface advantageously corresponds to said display screen 14.

When the display screen 14 is a viewer of the head down type, the projection surface corresponds to any other surface intended to be visualized on said screen.

In FIGS. 3, 6, 9 and 10, said projection surface is designated by reference "SP".

Lastly, the processing module 12 defines, in a land-based coordinate system, a horizontal reference plane that for example corresponds to a horizontal plane passing through the aircraft when the pitch angle thereof is equal to 0° or a horizontal plane situated slightly below the aircraft having such a pitch angle (for example 20° below the observation point).

During the initial step 110 of the first phase $P_1$, the processing module 12 determines a first plane representative of a perspective seen by the pilot. This is an imaginary plane in the space surrounding the aircraft.

This first plane is situated in front of the aircraft and intersects the longitudinal axis thereof. It is obtained by inclining the horizontal reference plane by a non-nil incline angle. This incline is for example done relative to a line of the horizontal reference plane perpendicular to the longitudinal axis of the aircraft. This line will be designated hereinafter by the term "horizontal reference line".

The first plane thus forms an upward slope relative to the direction of movement of the aircraft, and therefore relative to its longitudinal axis.

Furthermore, the first plane is truncated by the horizontal reference plane and extends below said horizontal reference plane. In this case, the incline angle of the first plane is between 0° and 90°, preferably between 10° and 30°, advantageously between 15° and 25°, and substantially equal to 20°.

In FIGS. 3, 6, 8 and 10, the first plane is designated by reference "$PI_1$" and the horizontal reference plane by reference "Pr".

During the following step 120, the processing module 12 determines a plurality of second planes representative of different pitch angles of the aircraft that are negative or equal to zero. Like in the previous case, these are imaginary planes.

In particular, each second plane is associated with a possible pitch angle of the aircraft and thus represents a plane that would be formed by the aircraft having said pitch angle and the nil incline. In other words, each second plane corresponds to the plane formed by the longitudinal axis and the transverse axis of the aircraft when the attitude thereof is defined by the pitch angle corresponding to said second plane and the nil incline. Thus, as will be demonstrated hereinafter, each second plane corresponds to a straight graduation of the pitch scale.

Furthermore, each second plane is built from the observation point along a regular angle that is for example between 3° and 10°, and is substantially equal to 5°.

Each second plane passes through the first plane along an intersection line. All of the intersection lines are parallel to one another.

In FIGS. 3, 6, 8 and 10, the second planes are designated by reference "$PI_2$" and the intersection lines by reference "DI".

During the following step 130, the processing module 12 truncates intersection lines via at least two pairs of first truncating planes to obtain at least two truncated parts of each intersection line.

Each truncated part of the intersection lines is comprised between the first truncating planes of a same pair of first truncating planes. The truncated parts comprised between a same pair of first truncating planes form a group.

Each first truncating plane is perpendicular to the horizontal reference plane.

Furthermore, each first truncating plane intersects the horizontal reference line.

At the aircraft, said two pairs of first truncating planes are situated on either side of the longitudinal axis. Thus for example, the spacing between the opposite first planes for the different pairs is chosen such that the line passing through the observation point and the intersection point of the horizontal reference line with one of the opposite planes forms, with the longitudinal axis, an angle of between 5° and 20°, and preferably between 10° and 15°. The advantage of such an arrangement of the first truncating planes will be explained hereinafter.

According to one example embodiment, each first truncating plane is parallel to the longitudinal axis of the aircraft.

According to another example embodiment, the angle between the first truncating planes of each pair of first truncating planes is variable as a function of the pitch angle of the aircraft, as will be explained hereinafter.

In FIGS. 3, 6, 8 and 10, reference "$PT_d$" designates the parts of the intersection lines DI truncated by six pairs of first truncating planes. Three of these pairs are arranged on the left of a symbol SA representative of the aircraft A, i.e., to the left of the longitudinal axis, and the other three of these pairs are arranged to the right of the symbol SA, i.e., to the right of the longitudinal axis.

During the following step 140, the processing module 12 projects the intersection lines, and in particular the truncated parts of these intersection lines, over the projection surface to obtain a plurality of straight projections over said projection surface.

According to one example embodiment, this projection is done such that the straight parallel projections are spaced apart from one another by a same distance.

In FIGS. 3, 6, 8 and 10, the straight projections coincide with the truncated parts $PT_d$ of the intersection lines DI.

During the initial step 210 of the second phase $P_2$, the processing module 12 determines a sphere centered on the observation point, truncated by the horizontal reference plane and extending above said horizontal reference plane.

The horizontal reference line for example forms a tangent to said sphere at the observation point.

Like in the previous cases, this is an imaginary sphere.

In FIGS. 3, 6, 8 and 10, the sphere is designated by reference "S".

During the following step 220, the processing module 12 determines a plurality of circles, each circle belonging to the sphere and extending in a plane parallel to the horizontal reference plane.

According to one example embodiment, the circles are chosen so that in a vertical plane including the observation point, the lines connecting the observation point with the intersection points of said plane with the circles are spaced apart angularly by a same angle.

In FIGS. 3, 6 and 8, the circles are designated by reference "C". In FIG. 10, these circles are not visible in light of a strong nose-down attitude of the aircraft A.

During the following step 230, the processing module 12 truncates circles via at least two pairs of second truncating planes to obtain at least two truncated parts of each circle.

Each truncated part of the circles is comprised between the second truncating planes of a same pair of second truncating planes.

Each second truncating plane is perpendicular to the horizontal reference plane.

Furthermore, each second truncating plane intersects the horizontal reference line.

At the aircraft, said two pairs of second truncating planes are situated on either side of the longitudinal axis. Thus for example, the spacing between the opposite second planes for the different pairs is chosen such that the line passing through the observation point and the intersection point of the horizontal reference line with one of the opposite planes forms, with the longitudinal axis, an angle of between 5° and 20°, and preferably between 10° and 15°. The advantage of such an arrangement of the first truncating planes will be explained hereinafter.

Each second truncating plane is parallel to the longitudinal axis of the aircraft. Thus, when the first truncating planes are also parallel to the longitudinal axis of the aircraft, at least some of the second truncating planes coincide with the corresponding first truncating planes.

In FIGS. 3, 6 and 8, reference "$PT_c$" designates the parts of the circles C truncated by two pairs of second truncating planes. One of these pairs is arranged on the left of the symbol SA, i.e., to the left of the longitudinal axis, and the other is arranged to the right of the symbol SA, i.e., to the right of the longitudinal axis.

During the following step 240, the processing module 12 projects the circles, and more particularly the truncated parts of said circles, over the projection surface to obtain a plurality of curved projections over said projection surface.

Like in the previous case, according to one example embodiment, this projection is done such that the curved projections corresponding to different circles are spaced apart from one another by a same distance in at least one direction passing through all of the curved projections.

In FIGS. 3, 6 and 8, the curved projections coincide with the truncated parts $PT_c$ of the circles C.

During the initial step 310 of the third phase $P_3$, the processing module 12 forms a pitch scale from straight projections determined during step 140 and curved projections determined during step 240.

The straight projections then form straight graduations of said scale to visualize negative pitch angles. The straight graduations form several groups corresponding to the groups of the truncated parts obtained during step 130.

The curved projections form curved graduations.

A zero graduation between the straight and curved graduations is also added to designate the nil pitch angle of the aircraft.

By construction, the different groups of straight graduations converge toward one another with the approach of the zero graduation from a lower border of the scale. Furthermore, the curvature of the curved graduations increases moving away from the zero graduation up to an upper border of the scale.

Then, during step 320, the processing module 12 displays, on the display screen 14, the determined pitch scale with an immobile symbol representative of the aircraft. This symbol is for example placed at the center of the corresponding screen.

Based on the current pitch angle of the aircraft, only part of this scale near the current pitch angle is displayed on the screen 14.

Different display examples on the screen 14 corresponding to the examples explained in reference to FIGS. 3, 6, 8 and 10 are schematically illustrated in FIGS. 4, 7, 9 and 11, respectively.

In these figures, reference E designates the formed pitch scale and the symbol SA designates the symbol representative of the aircraft A.

Figure 5:
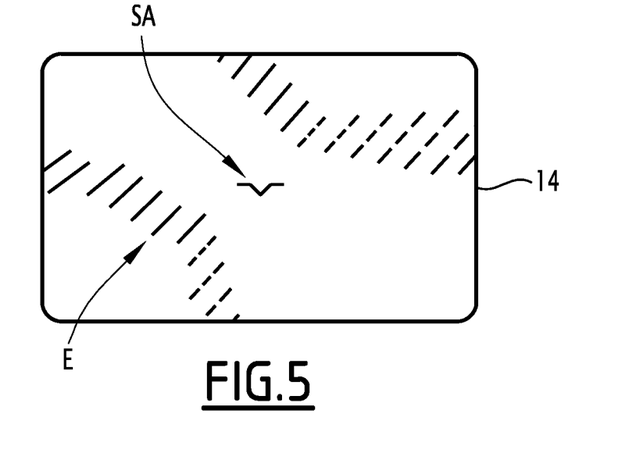

Furthermore, FIG. 5 illustrates an example display of the case corresponding to FIG. 3 with a non-nil incline of the aircraft A.

Optionally, the third phase $P_3$ further includes a visualization step 330 of specific symbols on the pitch scale near its upper and lower borders.

Thus for example, the upper border is reached for pitch angles greater than 70° and the lower border is reached for pitch angles below −70°.

Advantageously, the specific symbols are different for the upper border and the lower border.

One can then see that the invention comprises a certain number of advantages.

First of all, as shown in FIGS. 4, 7, 9 and 11, the particular arrangement of the straight projections on the pitch scale E makes it possible to create a perspective effect for the pilot. This effect is obtained by the first inclined plane relative to the horizontal plane and by a particular truncation of the intersection lines of the second planes with the first plane.

Indeed, this truncation on either side of the longitudinal axis makes it possible to create a convergence direction of the straight projections at a vanishing point (visible in FIGS. 3, 6 and 8). This vanishing point advantageously corresponds to a positive or negative pitch angle of the aircraft and may be reconstructed mentally by the pilot.

Thus, for the negative pitch angles, the pilot quickly realizes that the aircraft is in the process of going nose-down when the scale diverges and that the aircraft is in the process of pulling up when the scale converges.

For positive pitch angles, it is the curvature of the curved projections that tells the pilot the value of the pitch angle. In particular, the increase in the curvature of these projections tells the pilot that the aircraft is in the process of pulling up.

Furthermore, the particular arrangement of the straight and curved projections on either side of the longitudinal axis makes it possible to clear a central view for the pilot. This is in particular advantageous when the visualization is done on a head up display, since the pilot looks at the surroundings through said viewer.

One can then see that this makes it possible to avoid cases of disorientation of the pilot even in unusual situations, while demanding a minimal cognitive load from the pilot.

Lastly, it is possible to achieve different magnifications of the displayed pitch scale just by changing the position of the observation point and/or the projection surface.

The invention claimed is:

1. A visualization method of an attitude of an aircraft, comprising a formation of a pitch scale defining a lower border and an upper border, and including:
   to visualize a nil pitch angle of the aircraft, a zero graduation on the lower border and the upper border;
   to visualize a negative pitch angles of the aircraft, straight parallel graduations forming at least two groups converging toward one another with an approach of the zero graduation from the lower border;
   to visualize a positive pitch angles of the aircraft, curved graduations, a curvature of which increases moving away from the zero graduation toward the upper border;
   wherein the aircraft defines a longitudinal axis and an observation point of its attitude;
   the method further comprising a first phase for determining the straight graduations including:
   determining a first plane representative of a perspective, the first plane being situated in front of the aircraft, intersecting the longitudinal axis and being obtained by tilting a horizontal reference plane by a non-nil incline angle;
   determining a plurality of second planes representative of different negative pitch angles of the aircraft, each second plane including the observation point and passing through the first plane along an intersection line, the intersection lines being parallel to one another; and
   projecting the intersection lines over a projection surface to obtain a plurality of straight projections over said projection surface.

2. The method according to claim 1, wherein the groups of straight parallel graduations converge toward one another to a vanishing point corresponding to a predetermined pitch angle of the aircraft, the predetermined pitch angle preferably corresponding to a nil pitch angle of the aircraft.

3. The method according to claim 1, wherein the first phase further includes a step for truncating intersection lines via at least two pairs of first truncating planes to obtain at least two truncated parts of each intersection line, each truncated part being comprised between the first truncating planes of a same pair of first truncating planes, each first truncating plane being perpendicular to the horizontal reference plane;
   the straight projections then corresponding to projections of the truncated parts of the intersection lines over the projection surface.

4. The method according to claim 3, wherein said two pairs of first truncating planes are situated, at the aircraft level, on either side of the longitudinal axis.

5. The method according to claim 3, wherein the angle between the first truncating planes of a same pair of first truncating planes is variable as a function of the pitch angle of the aircraft.

6. The method according to claim 1, wherein:
   the groups of straight parallel graduations converge toward one another to a vanishing point corresponding to a predetermined pitch angle of the aircraft, the predetermined pitch angle preferably corresponding to a nil pitch angle of the aircraft,
   the vanishing point corresponds to the point of intersection of a set of lines connecting corresponding ends of the projections of corresponding truncated parts of the intersection lines.

7. The method according to claim 1, wherein, on the projection surface, the straight parallel projections are spaced apart from one another by a same distance.

8. The method according to claim 1, wherein, in the observation point, the second planes are spaced apart from one another by a same angle.

9. The method according to claim 1, wherein:
   the first plane is truncated by the horizontal reference plane and extends below said horizontal reference plane; and
   the incline angle of the first plane with respect to the horizontal reference plane is between 0° and 90°, preferably between 10° and 30°.

10. The method according to claim 1, wherein the aircraft defines a longitudinal axis and an observation point of its attitude;

the method further comprising a second phase for determining curved graduations including steps:

determining a sphere centered on the observation point, truncated by a horizontal reference plane and extending above said horizontal reference plane;

determining a plurality of circles, each circle belonging to the sphere and extending in planes parallel to the horizontal reference plane;

projecting circles over a projection surface to obtain a plurality of curved projections over said projection surface.

11. The method according to claim 10, wherein the method, further comprises a third visualization phase including:

building the pitch scale from straight projections forming the straight graduations and from curved projections forming the curved graduations;

visualizing the pitch scale and an immobile symbol representative of the aircraft on a display screen.

12. The method according to claim 11, the third phase further including a visualization step of symbols specific to the lower and upper borders of the pitch scale.

13. The method according to claim 10, a third phase further including a step for truncating circles via at least two pairs of second truncating planes to obtain at least two truncated parts of each circle, each truncated part being comprised between the second truncating planes of a same pair of second truncating planes, each second truncating plane being perpendicular to the horizontal reference plane;

the curved projections then corresponding to projections of the truncated parts of the circles over the projection surface.

14. The method according to claim 13, wherein said two pairs of second truncating planes are situated, at the aircraft, on either side of the longitudinal axis;

each second truncating plane preferably being parallel to the longitudinal axis.

15. A non-transitory computer-readable recording medium storing a program that causes a computer to execute a method, the method according to claim 1.

16. A visualization system of the attitude of the aircraft comprising:

a display screen;

a memory; and a processor coupled to the memory and the processor configured to carry out the method according to claim 1.

* * * * *